(12) United States Patent
Barkan et al.

(10) Patent No.: US 7,780,086 B2
(45) Date of Patent: Aug. 24, 2010

(54) IMAGING READER WITH PLURAL SOLID-STATE IMAGERS FOR ELECTRO-OPTICALLY READING INDICIA

(75) Inventors: Edward Barkan, Miller Place, NY (US); Mark Drzymala, Commack, NY (US); Igor Vinogradov, Bay Shore, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 510 days.

(21) Appl. No.: 11/823,818

(22) Filed: Jun. 28, 2007

(65) Prior Publication Data

US 2009/0001166 A1 Jan. 1, 2009

(51) Int. Cl.
*G02B 5/00* (2006.01)
*G06K 7/10* (2006.01)

(52) U.S. Cl. ............ 235/462.32; 235/439; 235/462.41; 235/462.14; 235/462.37; 235/462.43

(58) Field of Classification Search ............................... 235/462.01–462.49
See application file for complete search history.

(56) References Cited

U.S. PATENT DOCUMENTS

| | | | |
|---|---|---|---|
| 4,613,895 A | 9/1986 | Burkey et al. | |
| 4,794,239 A | 12/1988 | Allais | |
| 5,059,779 A | 10/1991 | Krichever et al. | |
| 5,124,539 A | 6/1992 | Krichever et al. | |
| 5,200,599 A | 4/1993 | Krichever et al. | |
| 5,304,786 A | 4/1994 | Pavlidis et al. | |
| 5,559,562 A | 9/1996 | Ferster | |
| 5,703,349 A | 12/1997 | Meyerson et al. | |
| 5,705,802 A * | 1/1998 | Bobba et al. | 235/462.39 |
| 5,717,195 A | 2/1998 | Feng et al. | |
| 5,936,218 A * | 8/1999 | Ohkawa et al. | 235/462.01 |
| 6,141,062 A | 10/2000 | Hall et al. | |
| 6,538,243 B1 * | 3/2003 | Bohn et al. | 250/208.1 |
| 6,899,272 B2 * | 5/2005 | Krichever et al. | 235/462.37 |
| 6,924,807 B2 | 8/2005 | Ebihara et al. | |
| 6,951,304 B2 * | 10/2005 | Good | 235/462.32 |
| 7,076,097 B2 | 7/2006 | Kondo et al. | |
| 7,116,353 B2 | 10/2006 | Hobson et al. | |
| 7,191,947 B2 | 3/2007 | Kahn et al. | |
| 7,280,124 B2 | 10/2007 | Laufer et al. | |
| 7,430,682 B2 | 9/2008 | Carlson et al. | |
| 2003/0029915 A1 | 2/2003 | Barkan et al. | |
| 2004/0146211 A1 | 7/2004 | Knapp et al. | |
| 2004/0189472 A1* | 9/2004 | Acosta et al. | 340/572.3 |
| 2005/0259746 A1 | 11/2005 | Shinde et al. | |
| 2006/0022051 A1* | 2/2006 | Patel et al. | 235/462.14 |
| 2007/0079029 A1 | 4/2007 | Carlson et al. | |

FOREIGN PATENT DOCUMENTS

WO 2009006419 1/2009

OTHER PUBLICATIONS

International Preliminary Report on Patentability dated Jan. 14, 2010 in related case PCT/US2008/068810.

* cited by examiner

*Primary Examiner*—Thien Minh Le
*Assistant Examiner*—Christle I Marshall

(57) ABSTRACT

A plurality of solid-state imagers is mounted in a reader, such as a bi-optical, dual window, point-of-transaction workstation, for capturing images along different fields of view of diverse targets useful for customer identification, customer payment validation, operator surveillance, and coded indicia. The imagers are commonly mounted on a circuit board for joint installation at, and joint removal from, the reader for ease of serviceability.

51 Claims, 3 Drawing Sheets

IMAGING READER WITH PLURAL SOLID-STATE IMAGERS FOR ELECTRO-OPTICALLY READING INDICIA

BACKGROUND OF THE INVENTION

Flat bed laser readers, also known as horizontal slot scanners, have been used to electro-optically read one-dimensional bar code symbols, particularly of the Universal Product Code (UPC) type, at a point-of-transaction workstation in supermarkets, warehouse clubs, department stores, and other kinds of retailers for many years. As exemplified by U.S. Pat. No. 5,059,779; U.S. Pat. No. 5,124,539 and U.S. Pat. No. 5,200,599, a single, horizontal window is set flush with, and built into, a horizontal countertop of the workstation. Products to be purchased bear an identifying symbol and are typically slid across the horizontal window through which a multitude of scan lines is projected in a generally upwards direction. When at least one of the scan lines sweeps over a symbol associated with a product, the symbol is processed and read.

The multitude of scan lines is generated by a scan pattern generator which includes a laser for emitting a laser beam at a mirrored component mounted on a shaft for rotation by a motor about an axis. A plurality of stationary mirrors is arranged about the axis. As the mirrored component turns, the laser beam is successively reflected onto the stationary mirrors for reflection therefrom through the horizontal window as a scan pattern of the scan lines.

It is also known to provide a point-of-transaction workstation not only with a generally horizontal window, but also with a generally vertical window that faces an operator at the workstation. The generally vertical window is oriented generally perpendicularly to the horizontal window, or is slightly rearwardly or forwardly inclined. The laser scan pattern generator within this dual window or bi-optical workstation also projects the multitude of scan lines in a generally outward direction through the vertical window toward the operator. The generator for the vertical window can be the same as or different from the generator for the horizontal window. The operator slides the products past either window from right to left, or from left to right, in a "swipe" mode. Alternatively, the operator merely presents the symbol on the product to a central region of either window in a "presentation" mode. The choice depends on operator preference or on the layout of the workstation.

Sometimes, the vertical window is not built into the workstation as a permanent installation. Instead, a vertical slot scanner is configured as a portable reader that is placed on the countertop of an existing horizontal slot scanner in a hands-free mode of operation. In the frequent event that large, heavy, or bulky products, that cannot easily be brought to the reader, have symbols that are required to be read, then the operator may also manually grasp the portable reader and lift it off, and remove it from, the countertop for reading the symbols in a handheld mode of operation.

Each product must be oriented by the operator with the symbol facing away from the operator and generally towards either window of the bi-optical workstation. Hence, the operator cannot see exactly where the symbol is during scanning. In typical "blind-aiming" usage, it is not uncommon for the operator to repeatedly swipe or present a single symbol several times before the symbol is successfully read, thereby slowing down transaction processing and reducing productivity.

The blind-aiming of the symbol is made more difficult because the position and orientation of the symbol are variable. The symbol may be located low or high, or right to left, on the product, or anywhere in between, or on any of six sides of a box-shaped product. The symbol may be oriented in a "picket fence" orientation in which the elongated parallel bars of the one-dimensional UPC symbol are vertical, or in a "ladder" orientation in which the symbol bars are horizontal, or at any orientation angle in between.

In such an environment, it is important that the laser scan lines located at, and projected from, either window provide a full coverage scan zone which extends down as close as possible to the countertop, and as high as possible above the countertop, and as wide as possible across the width of the countertop. The scan patterns projected into space in front of the windows grow rapidly in order to cover areas on products that are positioned not on the windows, but several inches therefrom. The scan zone must include scan lines oriented to read symbols positioned in any possible way across the entire volume of the scan zone.

As advantageous as these laser-based, point-of-transaction workstations are in processing transactions involving products associated with one-dimensional symbols each having a row of bars and spaces spaced apart along one direction, the workstations cannot process stacked symbols, such as Code 49 which introduced the concept of vertically stacking a plurality of rows of bar and space patterns in a single symbol, as described in U.S. Pat. No. 4,794,239, or PDF417 which increased the amount of data that could be represented or stored on a given amount of surface area, as described in U.S. Pat. No. 5,304,786, or two-dimensional symbols.

Both one- and two-dimensional symbols, as well as stacked symbols, can also be read by employing solid-state imagers which have a one- or two-dimensional array of cells or photosensors that correspond to image elements or pixels in a field of view of the imager. Such an imager may include a one- or two-dimensional charge coupled device (CCD) or a complementary metal oxide semiconductor (CMOS) device, as well as associated circuits for producing electronic signals corresponding to the one- or two-dimensional array of pixel information over the field of view.

It is therefore known to use a solid-state imager for capturing a monochrome image of a symbol as, for example, disclosed in U.S. Pat. No. 5,703,349. It is also known to use a solid-state imager with multiple buried channels for capturing a full color image of a target as, for example, disclosed in U.S. Pat. No. 4,613,895. It is common to provide a two-dimensional CCD with a 640×480 resolution commonly found in VGA monitors, although other resolution sizes are possible.

It is also known to install the solid-state imager, analogous to that conventionally used in a consumer digital camera, in a bi-optical, point-of-transaction workstation, as disclosed in U.S. Pat. No. 7,191,947 in which the dual use of both the solid-state imager and the laser scan pattern generator in the same workstation is disclosed. It is possible to replace all of the laser scan pattern generators with solid-state imagers in order to improve reliability and to enable the reading of two-dimensional and stacked symbols, as well as other targets.

However, it is thought that the overall imager-based reader would require about ten to twelve imagers in order to read a symbol that could be positioned anywhere on all six sides of a product. To be successful in the marketplace, an all imager-based reader must eliminate the need for so many imagers to bring the cost of all the imagers, as well as the cost of each imager, down to an acceptable level, and it must also match, or at least be comparable to, the working range, processing speed, productivity and performance of a laser-based reader.

In the case of a bi-optical workstation having dual windows, the all imager-based reader must use similar window sizes and must also be able to scan anywhere across the windows and over a comparable working range as that of a laser-based reader, so that operators can achieve the high scanning productivity they have come to expect without any need to learn a new scanning technique.

SUMMARY OF THE INVENTION

One feature of this invention resides, briefly stated, in a reader for, and a method of, electro-optically reading indicia, comprising a housing and a plurality of solid-state imagers at the housing, for capturing light from the indicia along different fields of view. Each imager preferably comprises a two-dimensional, charge coupled device (CCD) array of sub-megapixel size, e.g., 752 pixels wide×480 pixels high, in order to reduce the costs of the imagers, as compared to supermegapixel arrays. Each imager includes an illuminator for illuminating the indicia with illumination light from illumination light sources, e.g., light emitting diodes (LEDs). A controller is operative for controlling each illuminator to illuminate the indicia, for controlling each imager to capture the illumination light returning from the indicia over an exposure time period to produce electrical signals indicative of the indicia being read, and for processing the electrical signals to read the indicia. Each illuminator is only operative during the exposure time period. Each imager is controlled to capture the light from the indicia during different exposure time periods to avoid mutual interference among the illuminators. At least one of the imagers captures the light from the indicia along a return axis, and its illuminator directs the illumination light along an illumination axis that is angled toward the return axis.

In accordance with one aspect of this invention, the imagers are commonly mounted on a circuit board. This assembly enables joint installation at, and joint removal from, the housing for ease of serviceability. Advantageously, each illuminator is commonly mounted on the same circuit board. The controller is also preferably commonly mounted on the circuit board. Thus, by mounting most, if not all, of the electrical components on the same board, field maintenance is simplified.

In a preferred embodiment, the housing has one window located in a generally horizontal plane, and another window located in a generally upright plane that intersects the generally horizontal plane, thereby comprising a bi-optical workstation. Preferably, the circuit board on which the electrical components are mounted is no more than 100 millimeters below the generally horizontal plane. The imagers capture the light from the indicia through at least one of the windows. A first sub-plurality, e.g., three, of the imagers captures the light from the indicia through one of the windows, and a second sub-plurality, e.g., another three, of the imagers captures the light from the indicia through another of the windows. Each sub-plurality of the imagers captures the light from the indicia over different, intersecting fields of view.

In still another aspect of the invention, the return illumination light travels along an optical path within the housing between a respective window and a respective imager for a distance of at least thirty-five centimeters. Folding optics, such as mirrors, are operative for folding the optical path within the housing. Also, non-rotationally symmetrical optics, such as mirrors and lenses, are operative for optically modifying the field of view of at least one imager to correspond with at least one of the dimensions of the window. The optical elements within the housing, for folding at least one of the optical paths, are preferably commonly mounted on a support, particularly an enclosure that keeps dust, dirt, moisture, and like contaminants from reaching these optical elements. This support enables joint installation of the optical elements at, and joint removal of the optical elements from, the housing for ease of serviceability. The non-rotationally symmetrical optics for optically modifying the field of view of at least one of the imagers are preferably mounted on the respective imager.

By way of numerical example, the generally horizontal window in a conventional laser-based bi-optical workstation measures about four inches in width by about six inches in length, and the generally vertical window measures about six inches in width by about ten inches in length. The field of view of an imager capturing illumination light from the imager through a respective window does not inherently have these dimensions at the respective window and, hence, the field of view must be modified so that it matches the dimensions of the respective window at the respective window, thereby enabling indicia to be reliably read when located anywhere at the respective window, as well as within a range of working distances therefrom.

A weighing scale and/or an electronic article surveillance (EAS) deactivator and/or a radio identification device (RFID) reader are preferably located at the housing.

In accordance with another feature of this invention, the method of electro-optically reading indicia, is performed by capturing light from the indicia along different fields of view of a plurality of solid-state imagers at a housing, and commonly mounting the imagers on a circuit board for joint installation at, and joint removal from, the housing for ease of serviceability. Preferably, the housing is configured with one window located in a generally horizontal plane, and another window located in a generally upright plane that intersects the generally horizontal plane, each window being configured with dimensions.

In accordance with another aspect of this invention, optical elements are provided for folding at least one of the optical paths, and for optically modifying the field of view of at least one of the imagers to correspond with at least one of the dimensions of at least one of the windows. The optical elements for folding the optical path are commonly mounted on a support for joint installation at, and joint removal from, the housing for ease of serviceability. The optical elements for optically modifying the field of view are preferably mounted on each imager.

Hence, an all imager-based reader has been proposed that eliminates the need for ten to twelve imagers in order to read indicia that could be positioned anywhere on all six sides of a product. The cost of all the imagers, as well as the cost of each imager, has been reduced to an acceptable level. The all imager-based reader matches, or at least is comparable to, the working range, processing speed, productivity and performance of the laser-based reader. In the case of a bi-optical workstation having dual windows, the all imager-based reader uses similar window sizes and the indicia is able to be scanned anywhere across the windows and over a comparable working range as that of the laser-based reader, so that operators can achieve the high scanning productivity they have come to expect without any need to learn a new scanning technique.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
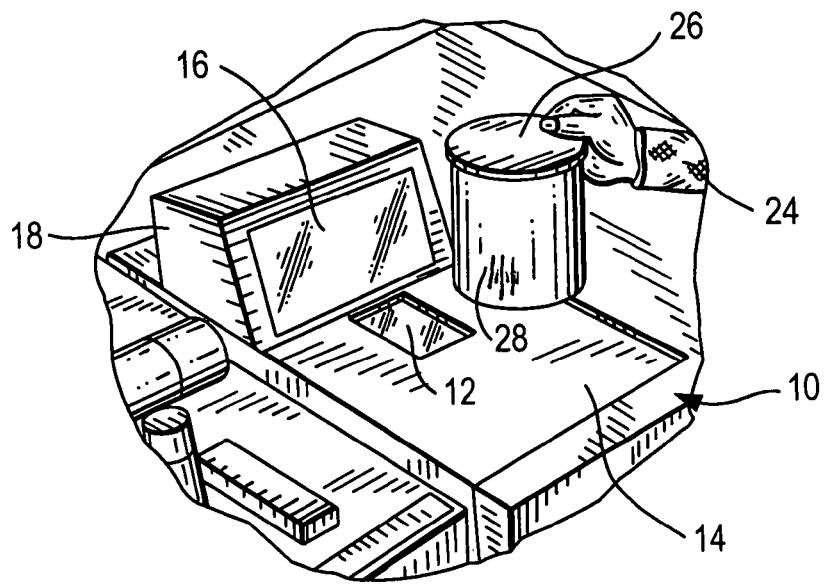
FIG. 1 is a perspective view of a dual window, bi-optical, point-of-transaction workstation or reader operative for reading indicia in accordance with this invention.

FIG. 1 depicts a dual window, bi-optical, point-of-transaction workstation 10 used by retailers to process transactions involving the purchase of products bearing an identifying target, such as the UPC symbol described above. Workstation 10 has a generally horizontal window 12 set flush with, or recessed into, a countertop 14, and a vertical or generally vertical (referred to as "vertical" or "upright" hereinafter) window 16 set flush with, or recessed into, a raised housing portion 18 above the countertop.

Figure 2:
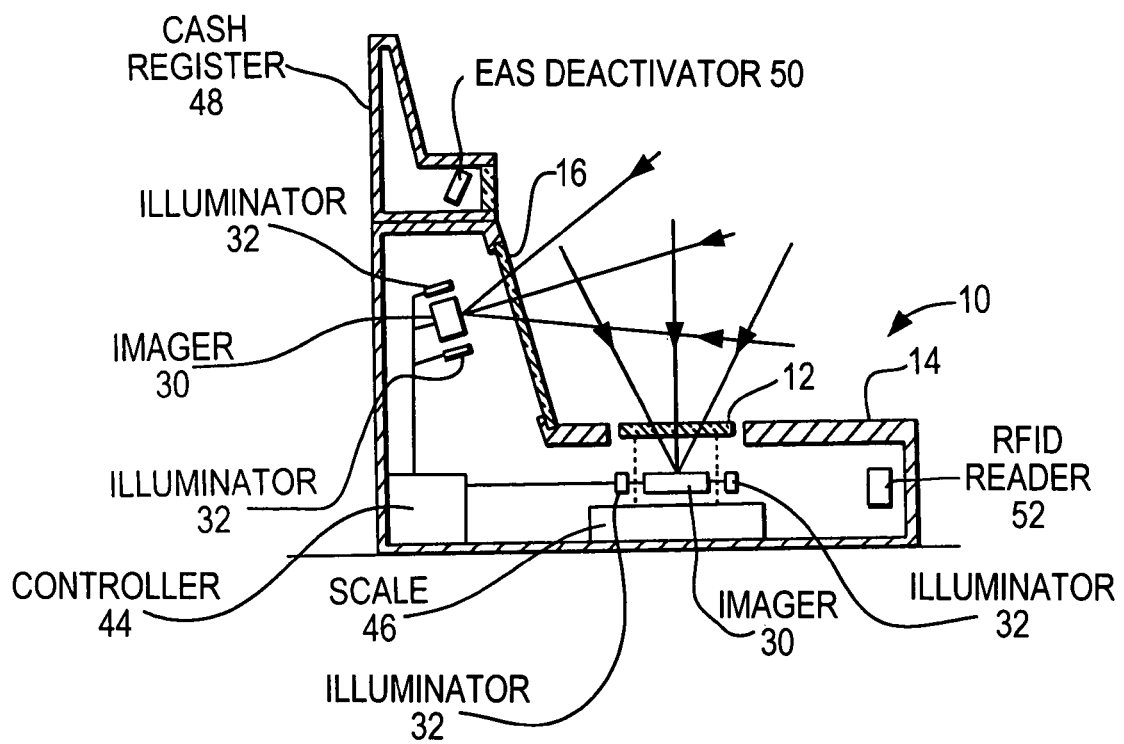
FIG. 2 is a part-sectional, part-diagrammatic, schematic view of a workstation analogous to that shown in FIG. 1.

As schematically shown in FIG. 2, a plurality of solid-state imagers 30, each including an illuminator 32, are also mounted at the workstation, for capturing light passing through either or both windows from a target which can be a one- or two-dimensional symbol, such as a two-dimensional symbol on a driver's license, or any document, as described below. Each imager 30 is a solid-state area array, preferably a CCD or CMOS array, of submegapixel size. Each imager 30 preferably has a global shutter, as described below. Each illuminator 32 is preferably one or more light sources, e.g., surface-mounted, light emitting diodes (LEDs), located at each imager 30 to uniformly illuminate the target, as further described below.

In use, an operator 24, such as a person working at a supermarket checkout counter, processes a product 26 bearing a UPC symbol 28 thereon, past the windows 12, 16 by swiping the product across a respective window in the abovementioned swipe mode, or by presenting the product at the respective window in the abovementioned presentation mode. The symbol 28 may located on any of the top, bottom, right, left, front and rear, sides of the product, and at least one, if not more, of the imagers 30 will capture the illumination light reflected, scattered, or otherwise returning from the symbol through one or both windows. The imagers are preferably looking through the windows at around 45° so that they can each see a side of the product that is generally perpendicular to, as well as generally parallel to, a respective window.

FIG. 2 also schematically depicts that a weighing scale 46, a cash register 48, and an electronic article surveillance (EAS) deactivator 50 are mounted at the workstation. The generally horizontal window 12 advantageously serves not only as a weighing platter for supporting a product to be weighed, but also allows the return light to pass therethrough. The register 48 can sit atop the raised housing portion 18, or be integrated therewith. radio frequency identification (RFID) reader 52 is also advantageously mounted at the workstation. The reader 52 can be mounted at any location and not only below the countertop 14, as shown.

As also schematically shown in FIG. 2, the imagers 30 and their associated illuminators 32 are operatively connected to a programmed microprocessor or controller 34 operative for controlling the operation of these and other components. Preferably, the microprocessor is the same as the one used for decoding the return light scattered from the target and for processing the captured target images.

In operation, the microprocessor 34 sends successive command signals to the illuminators 32 to pulse the LEDs for a short time period of 100 microseconds or less, and successively energizes the imagers 30 to collect light from a target only during said time period, also known as the exposure time period. By acquiring a target image during this brief time period, the image of the target is not excessively blurred even in the presence of relative motion between the imagers and the target.

There are several different types of targets that have particular utility for the enhancement of the operation of the workstation. The target may be a personal check, a credit card, or a debit card presented by a customer for payment of the products being purchased. The operator need only swipe or present these payment targets at one of the windows for image capture.

The target may also be a signature, a driver's license, or the consumer himself or herself. Capturing an image of the driver's license is particularly useful since many licenses are encoded with two-dimensional indicia bearing age information, which is useful in validating a customer's age and the customer's ability to purchase age-related products, such as alcoholic beverages or tobacco products.

The target may be the operator himself or herself, which is used for video surveillance for security purposes. Thus, it can be determined if the operator is actually scanning the products, or passing them around the window in an effort to bypass the window and not charge the customer in a criminal practice known in retailing as "sweethearting".

The target may, of course, be a two-dimensional symbol whose use is becoming more widespread, especially in manufacturing environments and in package delivery. Sometimes, the target includes various lengths of truncated symbols of the type frequently found on frequent shopper cards, coupons, loyalty cards, in which case the area imagers can read these additional symbols.

The energization of the imagers 30 can be manual and initiated by the operator. For example, the operator can depress a button, or a foot pedal, at the workstation. The energization can also be automatic such that the imagers operate in a continuous image acquisition mode, which is the desired mode for video surveillance of the operator, as well as for decoding two-dimensional symbols. In the preferred embodiment, all the imagers will be continuously sequentially energized for scanning symbols until such time as there has been a period of inactivity that exceeds a pre-program time interval. For example, if no symbols have been scanned for ten minutes, then after this time period has elapsed, the reader enters a power-savings mode in which one or more of the imagers will be omitted from sequential energization. Alternatively, illumination levels may be reduced or turned off. At least one imager will remain active for periodically capturing images. If the active imager detects anything changing within its field of view, this will indicate to the operator that a product bearing a symbol is moving into the field of view, and illumination and image capture will resume to provide high performance scanning.

As previously stated, FIG. 2 is only a schematic representation of an all imager-based reader as embodied in a bi-optical workstation. Other housings having different shapes, with one or more windows, are also within the spirit of this invention. A practical depiction of a bi-optical workstation in accordance with this invention is shown in FIGS. 3-4, in which all the imagers, now relabelled 1, 2, 3, 4, 5, and 6, and, optionally, their illuminators 32, as well as other electrical components, as described below, are commonly mounted on a printed circuit board 54 for joint installation at, and joint removal from, the workstation 10 for ease of serviceability.

Figure 3:
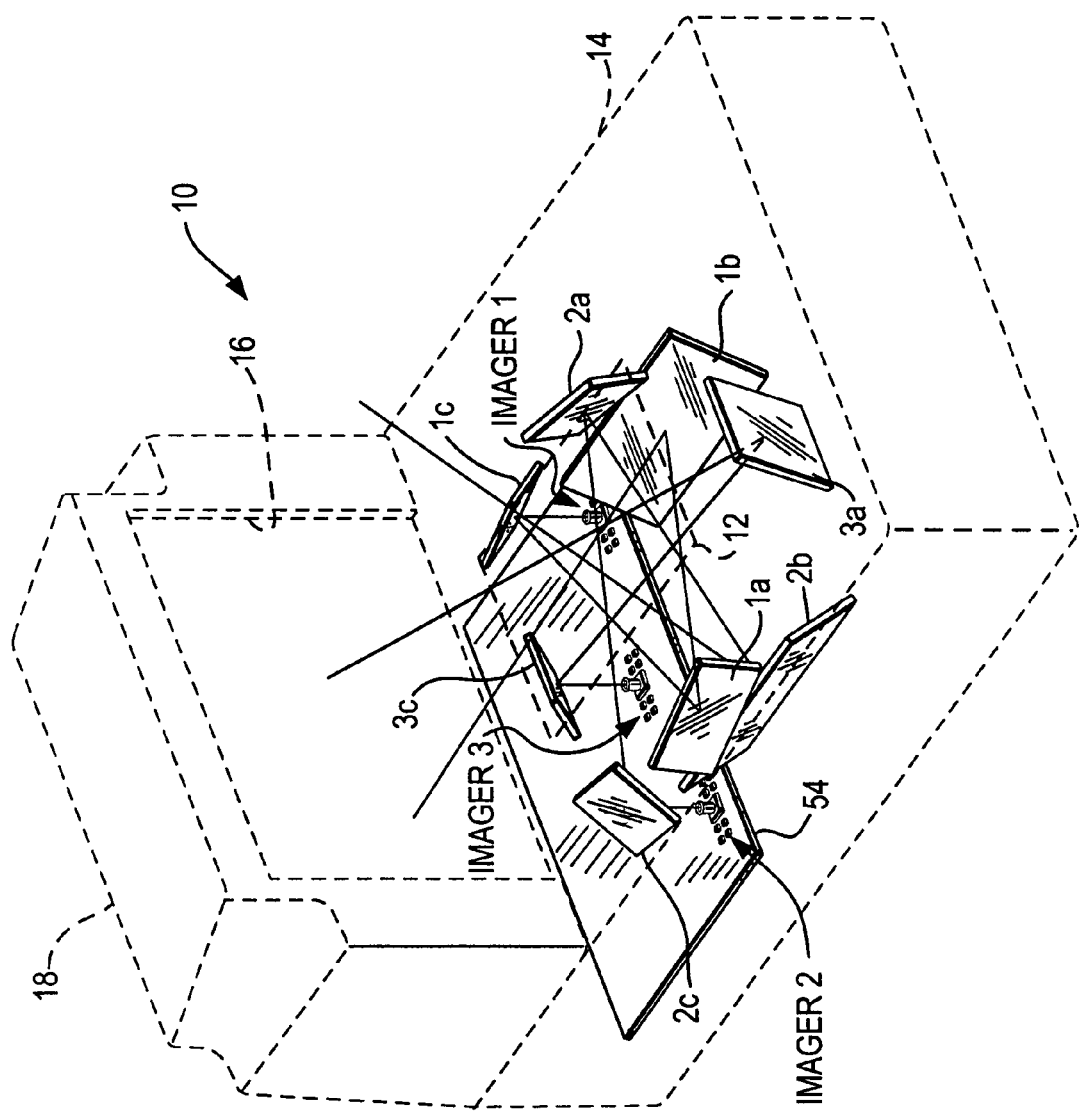
FIG. 3 is a perspective view of a dual window, bi-optical, point-of-transaction workstation or reader operative for reading indicia in accordance with this invention using a trio of imagers.
Figure 4:
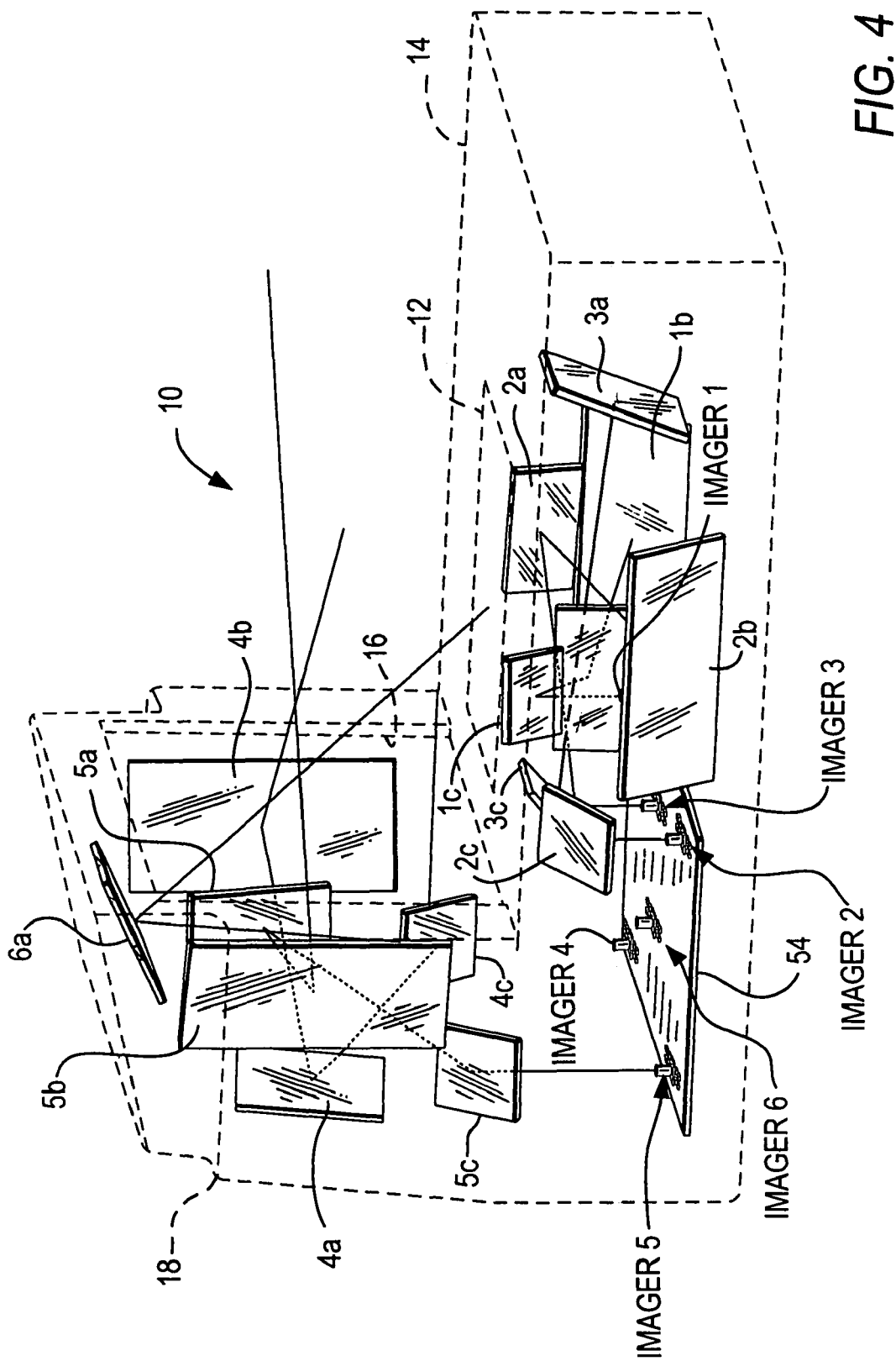
FIG. 4 is a view similar to FIG. 3 of another embodiment of this invention using six imagers.

As shown in FIG. 3, the board 54 lies in a generally horizontal plane generally parallel to, and below, the generally horizontal window 12, and imager 1 faces generally vertically upward toward an inclined folding mirror 1c directly overhead at a right side of the window 12. The folding mirror 1c faces another inclined narrow folding mirror 1a located at a left side of the window 12. The folding mirror 1a faces still another inclined wide folding mirror 1b adjacent the mirror 1c. The folding mirror 1b faces out through the generally horizontal window 12 toward the left side of the workstation.

Imager 2 and its associated optics is mirror symmetrical to imager 1 and its associated optics. Imager 2 faces generally vertically upward toward an inclined folding mirror 2c directly overhead at the left side of the window 12. The folding mirror 2c faces another inclined narrow folding mirror 2a located at the right side of the window 12. The folding mirror 2a faces still another inclined wide folding mirror 2b adjacent the mirror 2c. The folding mirror 2b faces out through the generally horizontal window 12 toward the right side of the workstation.

Imager 3 and its associated optics are located generally centrally between imagers 1 and 2 and their associated optics. Imager 3 faces generally vertically upward toward an inclined folding mirror 3c directly overhead generally centrally of the window 12 at one end thereof. The folding mirror 3c faces another inclined folding mirror 3a located at the opposite end of the window 12. The folding mirror 3a faces out through the window 12 in an upward direction toward the raised housing portion 18.

As described so far, a trio of imagers 1, 2 and 3 capture light along different, intersecting fields of view along different directions through the generally horizontal window 12. Turning now to FIG. 4, an additional trio of imagers 4, 5 and 6 capture light along different, intersecting fields of view along different directions through the generally vertical window 16.

More particularly, imager 4 faces generally vertically upward toward an inclined folding mirror 4c directly overhead at a right side of the window 16. The folding mirror 4c faces another inclined narrow folding mirror 4a located at a left side of the window 16. The folding mirror 4a faces still another inclined wide folding mirror 4b adjacent the mirror 4c. The folding mirror 4b faces out through the generally vertical window 16 toward the left side of the workstation.

Imager 5 and its associated optics is mirror symmetrical to imager 4 and its associated optics. Imager 5 faces generally vertically upward toward an inclined folding mirror 5c directly overhead at the left side of the window 16. The folding mirror 5c faces another inclined narrow folding mirror 5a located at the right side of the window 16. The folding mirror 5a faces still another inclined wide folding mirror 5b adjacent the mirror 5c. The folding mirror 5b faces out through the generally vertical window 16 toward the right side of the workstation.

Imager 6 and its associated optics are located generally centrally between imagers 4 and 5 and their associated optics. Imager 6 faces generally vertically upward toward an inclined folding mirror 6a directly overhead generally centrally of the window 16 at an upper end thereof. The folding mirror 6a faces out through the window 16 in a downward direction toward the countertop 14.

The all imager-based reader described herein is capable of reading indicia located anywhere on all six sides of a product, and to do so within a large scan volume over a relatively long working range. Hence, the all imager-based reader of this invention eliminates the need for ten to twelve imagers in order to read the indicia that could be positioned anywhere on all six sides of the product. The cost of all the imagers has been reduced to an acceptable level. The cost of the individual imagers must also be minimized and, hence, relatively inexpensive imagers having submegapixel sizes are preferred. For example, a wide VGA sensor array of 752×480 pixels can be used.

Each array should have a global shutter so that the captured images will not be disturbed by motion of the indicia relative to the window(s) during the exposure time period. The indicia can be presented or swiped at speeds up to around 100 inches per second across any part of either window. For an imager to be able to read an indicium that is moving rapidly, the indicium must be brightly illuminated by the illuminator 32 so that a short exposure time can be used. Bright illumination light shining out of either window can be annoying or uncomfortable to the operator, so the illumination light sources must not be directly viewable by the operator, or by a consumer standing nearby. A rolling or a mechanical shutter could also be employed.

In a conventional laser-based bi-optical workstation, the generally horizontal window measures about four inches in width by about six inches in length, and the generally vertical window measures about six inches in width by about ten inches in length. These large windows are filled with scan lines that project out several inches from the window, enabling indicia to be scanned anywhere within a large volume. The all imager-based bi-optical workstation of this invention preferably uses similar window sizes and must also be able to scan anywhere across the windows and over a comparable working range as a laser-based workstation. The field of view of an imager capturing illumination light from the imager through a respective window does not inherently have these dimensions at the respective window and, hence, the field of view must be modified so that it matches the dimensions of the respective window at the respective window, thereby enabling indicia to be reliably read when located anywhere at the respective window, as well as within a range of working distances therefrom.

To achieve these goals, the optical path length from each imager to a respective window is maximized to enable filling the windows with their combined fields of view, while still allowing a narrow divergence angle of each field of view. This narrow divergence angle extends the range over which adequate pixel resolution is maintained. The folding mirrors 1a,1b,1c; 2a,2b,2c; 3a,3c; 4a,4b,4c; 5a,5b,5c; and 6a are used to fit the long optical path within the limited depth and other housing dimensions that are typical of bi-optical workstations. An adequately small divergence angle can be achieved with an optical path length of around eighteen to twenty inches. Shorter optical path lengths can be used, but the working range of adequate resolution will be reduced since a wider divergence angle will be needed to create an adequately sized field of view. Alternatively, a narrower divergence angle can be used with a shorter optical path, but the size of the field of view at the respective window will be reduced, which makes the reader more difficult to use. This may be satisfactory for less demanding scanning applications.

An aspect ratio of the field of view of an imager is normally the same as the aspect ratio of the pixel array. For example, if the array is 752×480 pixels, then the aspect ratio of the field of view is 752/480, or 1.56:1. Another unique and important aspect of this invention is that non-rotationally symmetrical optical elements, such as wider folding mirrors 1b, 2b, 4b and 5b, are used in the optical paths of some of the imagers, e.g., imagers 1, 2, 4 and 5, so as to modify the aspect ratio of their fields of view. The wider or longer folding mirrors 1b, 2b, 4b and 5b, as compared to their respectively associated narrower or shorter folding mirrors 1a, 2a, 4a and 5a, expands the respective field of view. This allows the shape of the fields of view to better fill the windows without being partially blocked by the edges of the windows, and also increases resolution of indicia that is tilted with respect to an optical axis of a respective imager. Other than wider mirrors, the field of view can also be modified by a lens or a lens surface integral within a focusing lens assembly associated with the respective imager.

A primary example of a situation where the reader must be able to read the indicia even when tilted with respect to the optical axis of the imager is the case where the indicia is flat against the generally horizontal window or against the generally vertical window, or the indicia is on a surface that is generally perpendicular to either window. The modified field of view angle of the imagers increases resolution along the 480 pixel axis (in the preferred embodiment), as compared to what it would have been if the field of view was unmodified, and if the size of the field of view in the 742 pixel dimension was the same as is needed to fill the windows with the fields of view.

In the preferred embodiment, the representative imager 1 uses the non-rotationally symmetrical optics or longer mirror 1b to increase the width of the wide dimension of the field of view (the dimension that is 752 pixels wide) by around 50%, as compared to what it would be with conventional rotationally symmetrical optics. The same is true for imager 2, imager 4 and imager 5. Imagers 3 and 6 do not use modified fields of view in the preferred embodiment shown, but they could be modified as necessary in different designs.

The same results could be achieved by shrinking the 480 pixel axis of the field of view (as opposed to increasing the 752 pixel axis), or shrinking one axis a little and increasing the other axis a little, as necessary, to achieve the desired aspect ratio of the field of view dimensions. Any method used to modify the aspect ratio of the field of view of at least one of the imagers falls within the spirit of this invention.

The combination of long optical paths and modified fields of view of some of the imagers is what makes the preferred embodiment able to achieve adequate resolution over the necessary working range while simultaneously essentially filling the windows with fields of view so that indicia can be scanned anywhere across either window, and also enabling high resolution imaging of indicia that are tilted with respect to the optical axes of the imagers. In other reader designs, these two features may be used independently, depending on the needs of the particular reader design. For example, a reader that does not need as much range may use an imager with a modified field of view, but not an extended path length, or vice versa. Notice, however, that in the preferred embodiment, if either the optical path length was reduced, or the aspect ratios of the fields of view were unmodified, additional imagers would have been needed to achieve the same scanning performance.

In the preferred embodiment, as noted above, each imager has an associated set of LEDs 32 that illuminate the indicia. The LED illumination systems include lenses (not shown) that concentrate the LED illumination light of each illuminator into a solid angle that approximately matches the field of view of each imager. The illumination for each imager is reflected off of the same folding mirrors as the field of view of its associated imager.

In many locations, the indicia can be seen by more than one imager. For example, an indicium located flat against the horizontal window 12 can be seen by both imager 1 and imager 2. These two imagers look at the indicium from different angles, and their associated illuminators 32 illuminate the indicium from different angles. As a result, a glossy indicium which may be obscured by specular reflection from the point of view of one of the imagers 1, 2 will not be obscured as seen from the position of the other imager 2, 1, so that the indicium will still be readable. Of course, the reader's capability to read any indicium is increased by its ability to see the indicium with more than one imager, even in situations where specular reflection is not an issue.

In operation, in the preferred embodiment, the imagers will not be capturing images all at the same time. For example, imager 1 might capture an image first, followed by imager 2, imager 3, etc. Each imager will need an exposure time that is less than about 0.5 milliseconds, and each imager can capture a new image every 16.6 ms or so. Hence, if each imager captures an image approximately every 2.7 ms, all the imagers will capture an image about every 16.6 ms with no two imagers operating at the same time. The illumination LEDs 32 associated with each imager will only be energized during that imager's exposure time. This eliminates the possibility of uneven illumination that could occur if more than one set of illumination LEDs was energized at the same time. It also minimizes the peak current consumption of the entire reader, by eliminating the need to energize more than one set of illumination LEDs at the same time. Of course, it would also be possible to energize more than one imager at a time, as long as the light from any one imager did not interfere with the other imagers.

In the preferred embodiment, imagers 1, 2, 4 and 5 and their associated optics are all identical. They are focused at the same distance and use the same non-rotationally symmetrical optics to modify the aspect ratio of their respective field of view. Imagers 3 and 6 are identical to each other also. Hence, only two different imager designs are needed, thereby minimizing manufacturing cost.

Each illumination LED 32 will preferably be operating at a low duty cycle (less than around 3%) so that their illumination light will not look as bright to the human eye as they would look if they were energized continuously. Even so, since these are preferably very high powered LEDs, they can look dazzlingly bright if viewed directly. Light baffles (not shown) will therefore be installed to prevent direct viewing of the LEDs through either window by the operator. The only way to directly view the LEDs will be to position the eye in or very close to the field of view of one of the imagers. These fields of view and their associated illuminators do not project into the operator's eyes, or into the eyes of consumers who may be standing nearby during the reading process. Notice that the field of view and the associated illumination of imager 3 is projected towards the generally vertical window 16 of the reader, which blocks it from shining on a consumer who might be behind the end of the reader. Imager 6 and its associated illumination is aimed downwards toward the countertop 14 to avoid shining in the operator's eyes.

There is some parallax between each set of illumination LEDs 32 and its associated imager. The direction of the illumination light rays from the LEDs 32 which are mounted on opposite sides of each imager is tilted to converge at a distance from the imager, so that the two illumination beams coincide as much as possible with the field of view of the imager over as much of the working range as possible. Each LED light beam needs to be tilted by only around one degree towards the imager to achieve this. Tilt of the LED light beam can be accomplished by shifting the LED focusing lens slightly closer to the imager than the LEDs are.

Operators of bi-optical readers need them to be very reliable. The solid-state nature of the imagers inherently improve reliability as compared to a laser-based reader, but provision for easy serviceability is still important, to minimize downtime in the unlikely event of a failure. The preferred embodiment therefore combines some, if not all, of the imagers onto the single circuit board 54. The illuminators are also mounted on the same board 54. The controller 44 is also mounted on the same board 54.

The rest of the reader consists only of mirrors supported inside a sealed enclosure, to keep them clean of dust, dirt, moisture and like contaminants. Any repairs will therefore simply require a change of the circuit board 54, which can be removable after a gasketed access panel on the bottom of the reader is removed. The sealed enclosure for the folding mirrors is placed above the circuit board 54 and is likewise easily interchangeable with another for field maintenance.

Interface and power supply connectors, not shown, will be mounted on the same circuit board 54 as at least some of the imagers, and will be accessible through openings in the housing.

The preferred embodiment shown is for a six-sided reader. Six-sided reading is most commonly used in supermarkets. Department stores and mass merchandisers, however, often use bi-optical readers, but do not need a six-sided scanning capability. A less expensive imaging bi-optical reader can be created for department stores and mass merchandisers by eliminating one of more imagers. For example, elimination of imagers 3 and 6 will still provide performance adequate for the needs of many department stores.

A further feature is that the depth of the reader below the countertop 14 does not exceed 100 mm and satisfies regulated requirements in many European countries.

It will be understood that each of the elements described above, or two or more together, also may find a useful application in other types of constructions differing from the types described above.

While the invention has been illustrated and described as embodied in a point-of transaction workstation for electro-optically reading indicia by using plural imagers, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. A reader for electro-optically reading indicia, comprising:
   a housing;
   a plurality of solid-state imagers at the housing, for capturing light from the indicia along different fields of view;
   a circuit board on which the imagers are commonly mounted for joint installation at, and joint removal from, the housing for ease of serviceability;
   wherein the housing has one window located in a generally horizontal plane, and another window located in a generally upright plane that intersects the generally horizontal plane; and
   wherein at least one of the imagers captures the light from the indicia through one of the windows following a folded optical path within the housing, the at least one of the imagers includes an illuminator for illuminating the indicia with illumination light at a solid angle that generally corresponds to the field of view of the at least one of the imagers.

2. The reader of claim 1, wherein each imager includes one of a two-dimensional, charge coupled device (CCD) array and a complementary metal oxide semiconductor (CMOS) array, each of submegapixel size.

3. The reader of claim 1, wherein each imager includes an illuminator for illuminating the indicia during an exposure time period, and wherein each imager captures the light from a respective illuminator during a respective exposure time period, and wherein each illuminator is commonly mounted on the circuit board.

4. The reader of claim 1, wherein the folded optical path has a total length of at least thirty-five centimeters within the housing.

5. The reader of claim 1, further comprising folding optics for constructing the folded optical path.

6. The reader of claim 1, wherein the one of the windows has length and width dimensions; and comprising non-rotationally symmetrical optics for optically modifying the field of view of the at least one imager to generally correspond with at least one of the dimensions of the one of the windows.

7. The reader of claim 6, wherein each imager includes an illuminator for illuminating the indicia with illumination light at a solid angle that generally corresponds to the optically modified field of view.

8. The reader of claim 1, and a controller for controlling each imager to produce electrical signals indicative of the indicia being read, and for processing the electrical signals to read the indicia, and wherein the controller is commonly mounted on the circuit board.

9. The reader of claim 1, wherein a first sub-plurality of the imagers captures the light from the indicia through one of the windows, and wherein a second sub-plurality of the imagers captures the light from the indicia through another of the windows, and wherein each sub-plurality of the imagers captures the light from the indicia over different, intersecting fields of view.

10. The reader of claim 1, wherein one of the imagers captures the light in one direction from the indicia through one of the windows, and wherein another of the imagers captures the light in another direction from the indicia through another of the windows.

11. The reader of claim 10, wherein the one direction includes an angle of about 45 degrees with respect to the other direction.

12. The reader of claim 1, and a controller for controlling each imager to capture the light from the indicia during different exposure time periods.

13. The reader of claim 1, wherein at least one of the imagers captures the light from the indicia along a return axis, and includes an illuminator for illuminating the indicia during an exposure time period along an illumination axis that is angled toward the return axis.

14. The reader of claim 1, and a controller for controlling each imager to capture the light from the indicia during an exposure time period, and wherein each imager includes an illuminator controlled by the controller for illuminating the indicia only during the exposure time period of its respective imager.

15. The reader of claim 1, wherein the illuminator in the at least one of the imagers is configured to illuminate the indicia with illumination light that travels along the folded optical path.

16. The reader of claim 15, wherein the illuminator includes two LEDs commonly mounted on the circuit board.

17. The reader of claim 1, wherein one of the imagers captures the light in one direction from the indicia, and wherein another of the imagers captures the light in another direction from the indicia, and a single controller for controlling each imager to produce electrical signals indicative of the indicia being read, and for processing the electrical signals to read the indicia.

18. The reader of claim 1, and at least one of a weighing scale and an electronic article surveillance (EAS) deactivator at the housing.

19. The reader of claim 1, wherein the circuit board on which the imagers are mounted is no more than 100 millimeters below the generally horizontal plane.

20. A reader for electro-optically reading indicia, comprising:
a housing having one window located in a generally horizontal plane, and another window located in a generally upright plane that intersects the generally horizontal plane;
a plurality of solid-state imagers within the housing, for capturing light from the indicia over fields of view through the windows along optical paths within the housing between a respective window and a respective imager; and
optical elements within the housing, for folding at least one of the optical paths, and for optically modifying the field of view of at least one of the imagers to result in at least a change of an aspect ratio of the field of view.

21. The reader of claim 20, and a circuit board on which the imagers are commonly mounted for joint installation at, and joint removal from, the housing for ease of serviceability.

22. The reader of claim 21, wherein the circuit board on which the imagers are mounted is no more than 100 millimeters below the generally horizontal plane.

23. The reader of claim 20, and a support on which at least some of the optical elements are commonly mounted for joint installation at, and joint removal from, the housing for ease of serviceability.

24. The reader of claim 20, wherein at least some of the optical elements are commonly mounted on the imagers.

25. The reader of claim 20, wherein each imager includes an illuminator for illuminating the indicia with illumination light at a solid angle that generally corresponds to the optically modified field of view.

26. The reader of claim 20, wherein each imager includes one of a two-dimensional, charge coupled device (CCD) array and a complementary metal oxide semiconductor (CMOS) array, each of submegapixel size.

27. The reader of claim 20, wherein the at least one optical path extends over a distance of at least thirty-five centimeters.

28. The reader of claim 20, wherein a first sub-plurality of the imagers captures the light from the indicia through one of the windows, and wherein a second sub-plurality of the imagers captures the light from the indicia through another of the windows, and wherein each sub-plurality of the imagers captures the light from the indicia over different, intersecting fields of view.

29. The reader of claim 20, and a controller for controlling each imager to capture the light from the indicia during different exposure time periods.

30. The reader of claim 20, and at least one of a weighing scale and an electronic article surveillance (EAS) deactivator at the housing.

31. A method of electro-optically reading indicia, comprising the steps of:
capturing light from the indicia along different fields of view of a plurality of solid-state imagers at a housing;
commonly mounting the imagers on a circuit board for joint installation at, and joint removal from, the housing for ease of serviceability;
configuring the housing with one window located in a generally horizontal plane, and another window located in a generally upright plane that intersects the generally horizontal plane; and
wherein the capturing step includes illuminating the indicia and capturing the light from the indicia with at least one of the imagers through at least one of the windows, the light travels along a folded optical path within the housing between the window and the at least one imager, the indicia is illuminated with illumination light at a solid angle that generally corresponds to the field of view of the at least one of the imagers.

32. The method of claim 31, and configuring each imager with one of a two-dimensional, charge coupled device (CCD) array and a complementary metal oxide semiconductor (CMOS) array, each of submegapixel size.

33. The method of claim 31, and illuminating the indicia with illumination light from an illuminator during an exposure time period, and wherein the capturing step is performed by capturing the light from a respective illuminator during a respective exposure time period, and commonly mounting each illuminator on the circuit board.

34. The method of claim 31, wherein the folded optical path has a total length of at least thirty-five centimeters within the housing.

35. The method of claim 31, and configuring the at least one of the windows with length and width dimensions; and optically modifying the field of view of the at least one imager to generally correspond with at least one of the dimensions of the at least one of the windows.

36. The method of claim 35, and illuminating the indicia with illumination light at a solid angle that generally corresponds with the optically modified field of view.

37. The method of claim 31, and controlling each imager with a controller to produce electrical signals indicative of the indicia being read, and processing the electrical signals to read the indicia, and commonly mounting the controller on the circuit board.

38. The method of claim 31, wherein the capturing step is performed by capturing the light by a first sub-plurality of the imagers through one of the windows, and wherein the capturing step is performed by capturing the light by a second sub-plurality of the imagers through another of the windows, and wherein each sub-plurality of the imagers captures the light from the indicia over different, intersecting fields of view.

39. The method of claim 31, wherein the capturing step is performed by capturing the light by one of the imagers in one direction from the indicia through one of the windows, and wherein the capturing step is performed by capturing the light by another of the imagers in another direction from the indicia through another of the windows.

40. The method of claim 39, wherein the one direction includes an angle of about 45 degrees with respect to the other direction.

41. The method of claim 31, and controlling each imager to capture the light from the indicia during different exposure time periods.

42. The method of claim 31, wherein the capturing step is performed by capturing the light by at least one of the imagers from the indicia along a return axis, and illuminating the indicia during an exposure time period along an illumination axis that is angled toward the return axis.

43. The method of claim 31, and controlling each imager to capture the light from the indicia during an exposure time period, and illuminating the indicia only during the exposure time period of its respective imager.

44. The method of claim 31, wherein the capturing step includes illuminating the indicia with illumination light that travels along the folded optical path within the housing.

45. The method of claim 44, wherein the capturing step includes generating the illumination light with two LEDs commonly mounted on the circuit board.

46. The method of claim 31, wherein the capturing step is performed by capturing the light in one direction from the indicia by one of the imagers, and wherein the capturing step is performed by capturing the light in another direction from the indicia by another of the imagers, and controlling each imager to produce electrical signals indicative of the indicia being read, and processing the electrical signals to read the indicia.

47. The method of claim 31, and providing at least one of a weighing scale and an electronic article surveillance (EAS) deactivator at the housing.

48. The method of claim 31, and configuring the housing with a window located in a generally horizontal plane, and locating the circuit board on which the imagers are mounted to be no more than 100 millimeters below the generally horizontal plane.

49. A method of electro-optically reading indicia, comprising the steps of:
configuring a housing with one window located in a generally horizontal plane, and another window located in a generally upright plane that intersects the generally horizontal plane;
capturing light from the indicia over fields of view of a plurality of solid-state imagers within the housing, through the windows along optical paths within the housing between a respective window and a respective imager; and
folding at least one of the optical paths, and optically modifying the field of view of at least one of the imagers to result in at least a change of an aspect ratio of the field of view.

50. The method of claim 49, and commonly mounting the imagers on a circuit board for joint installation at, and joint removal from, the housing for ease of serviceability.

51. The method of claim 49, wherein the folding and modifying steps are performed by optical elements, and commonly mounting at least some of the optical elements on a support for joint installation at, and joint removal from, the housing for ease of serviceability.

\* \* \* \* \*